(12) United States Patent
Alfred et al.

(10) Patent No.: US 10,965,450 B2
(45) Date of Patent: Mar. 30, 2021

(54) IN-VEHICLE NETWORKING

(71) Applicants: 2236008 Ontario Inc., Waterloo (CA); Certicom Corp., Mississauga (CA)

(72) Inventors: James Robert Alfred, Oakville (CA); Sergei Sidorov, Markham (CA); Ming Chee Tsang, Mississauga (CA); Scott Lee Linke, Fort Collins, CO (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/385,605

(22) Filed: Apr. 16, 2019

(65) Prior Publication Data

US 2019/0268763 A1 Aug. 29, 2019

Related U.S. Application Data

(62) Division of application No. 15/270,957, filed on Sep. 20, 2016, now Pat. No. 10,285,051.

(51) Int. Cl.
*H04L 9/12* (2006.01)
*G06F 21/44* (2013.01)
(Continued)

(52) U.S. Cl.
CPC ............ *H04L 9/0838* (2013.01); *H04L 9/088* (2013.01); *H04L 63/0442* (2013.01); *H04L 63/061* (2013.01); *H04L 63/0823* (2013.01); *H04L 67/12* (2013.01); *H04L 67/146* (2013.01); *H04L 67/28* (2013.01); *H04W 12/0401* (2019.01);
(Continued)

(58) Field of Classification Search
None
See application file for complete search history.

(56) References Cited

U.S. PATENT DOCUMENTS 7,551,986 B2 * 6/2009 Ando .................. G06F 8/61 701/1
7,602,915 B2 * 10/2009 Iwamura ............... H04L 9/0822 380/259

(Continued)

FOREIGN PATENT DOCUMENTS

CN 104724007 A 6/2015
CN 105187376 A 12/2015

(Continued)

OTHER PUBLICATIONS

KR101740957. Woo et al. (Year: 2017).*

(Continued)

*Primary Examiner* — Venkat Perungavoor
(74) *Attorney, Agent, or Firm* — Trop, Pruner & Hu, P.C.

(57) ABSTRACT

A system and method for securing communication across an in-vehicle bus, includes establishing a connection between a gateway in a vehicle and the in-vehicle bus; generating a session key at the gateway within the vehicle; transmitting a public key certificate and ephemeral key to the gateway and an electronic control unit of the vehicle; generating a shared secret at the gateway and the electronic control unit, respectively; encrypting the session key with the shared secret at the gateway; receiving the encrypted session key through the in-vehicle bus at the electronic control unit; and decrypting the encrypted session key based on the shared secret generated at the electronic control unit.

20 Claims, 5 Drawing Sheets

(51) Int. Cl.
*H04L 9/08* (2006.01)
*H04L 29/08* (2006.01)
*H04W 12/04* (2021.01)
*H04W 12/06* (2021.01)
*H04L 29/06* (2006.01)
*G06F 21/57* (2013.01)

(52) U.S. Cl.
CPC ........... *H04W 12/04031* (2019.01); *H04W 12/04033* (2019.01); *H04W 12/04071* (2019.01); *H04W 12/0609* (2019.01); *H04L 9/0819* (2013.01); *H04L 63/062* (2013.01); *H04L 2209/84* (2013.01); *H04L 2463/061* (2013.01)

(56) References Cited

U.S. PATENT DOCUMENTS

| | | | | |
|---|---|---|---|---|
| 8,089,339 | B2* | 1/2012 | Mikan | G07C 9/00309 235/384 |
| 8,972,736 | B2* | 3/2015 | Peirce | H04L 63/0428 173/161 |
| 9,288,048 | B2* | 3/2016 | Han | H04L 9/3271 |
| 9,327,146 | B2* | 5/2016 | Rittner | A62B 18/02 |
| 10,055,904 | B2* | 8/2018 | Miller | H04L 12/4625 |
| 10,255,428 | B2* | 4/2019 | Komano | G06F 21/44 |
| 2003/0147534 | A1* | 8/2003 | Ablay | H04L 9/3252 380/270 |
| 2005/0187674 | A1* | 8/2005 | Ando | G06F 8/61 701/1 |
| 2006/0115085 | A1* | 6/2006 | Iwamura | H04L 9/0822 380/259 |
| 2010/0250053 | A1 | 9/2010 | Grill et al. | |
| 2012/0095642 | A1* | 4/2012 | Nishida | H04L 63/105 701/31.4 |
| 2014/0114497 | A1* | 4/2014 | Miyake | H04L 9/3271 701/1 |
| 2014/0317729 | A1* | 10/2014 | Naitou | H04L 63/08 726/21 |
| 2015/0033016 | A1 | 1/2015 | Thornton et al. | |
| 2015/0172298 | A1* | 6/2015 | Otsuka | H04L 63/1408 726/30 |
| 2016/0277923 | A1 | 9/2016 | Steffey | |
| 2016/0344705 | A1 | 11/2016 | Stumpf | |
| 2017/0093866 | A1* | 3/2017 | Ben-Noon | G06F 21/35 |
| 2017/0111177 | A1* | 4/2017 | Oguma | H04L 67/12 |

FOREIGN PATENT DOCUMENTS

| | | |
|---|---|---|
| CN | 105794146 A | 7/2016 |
| CN | 105847037 A | 8/2016 |

OTHER PUBLICATIONS

Car2X Communication: Securing the Last Meter. Schweppe et al. IEEE. (Year: 2011).*
On Authentication in a Connected Vehicle: Secure Integration of Mobile Device with Vehicular Networks. Han et al. ACM. (Year: 2013).*
A Partaical Wireless Attack on the Connected Car and Security Protocol for In-Vehicle CAN. Woo et al. IEEE. (Year: 2015).*
A Survey of Security and Privacy in Connected Vehicles. Othmane et al. Springer (Year: 2015).*
KR1016516488. Kim, JiSung. (Year: 2016).*
Secure and Authentic Communication on Existing In-Vheicle Networks. Groll et al. IEEE(Year: 2009).*
Survey on Security Threats and Protection Mechanism in Embedded Automotive Networks. Studnia et al. IEEE. (Year: 2013).*
In-Vehicle Automotive Network Gateway Electronic Control Unit for Low Price Vehicle . Dudu et al. Sastech. (Year: 2009).*
European Search Report corresponding to EP 179191018.5 dated Nov. 23, 2017, 8 pages.
KR20150007573, English Translation (Year: 2015).

* cited by examiner

IN-VEHICLE NETWORKING

CROSS REFERENCE TO RELATED APPLICATION

This is a divisional of U.S. application Ser. No. 15/270,957, filed Sep. 20, 2016, which is hereby incorporated by reference.

BACKGROUND OF THE DISCLOSURE

Technical Field

This disclosure relates to networks and more particularly to protocols that provide secure communication over vehicle networks.

Related Art

In-vehicle networks were developed by automotive manufactures to reduce tailpipe emissions, increase fuel economy, and improve vehicle drivability. The network's point-to-point connections transferred data between vehicle components. But as components and capabilities increased, the complexity and size of the networks became larger, impractical, and expensive.

To reduce complexity and cost, serial buses were developed that facilitated communication with embedded vehicle systems. One such system, known as a Controller Area Network (CAN), is a low cost light protocol system that allows microcontrollers to communicate openly with one another. The protocol includes built in features such as a cyclical redundancy code (CRC) check that allows vehicle application to detect errors during transmission, storage, and retrieval.

BRIEF DESCRIPTION OF THE DRAWINGS

The inventions can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

While designed to provide an efficient cost-effective structure for in-vehicle communication, both commercial and open source implementations of CAN networks are inherently insecure as they rely on good behavior to prevent attacks. No arbitrator is needed to resolve disputes on these networks because good behavior is assured.

While good behavior may work well in unconnected cars, it provides no protection for vehicles that connect to infrastructure (V-2-I), to retail (V-2-R), and to persons (V-2-P) outside of the car through in-vehicle and remote networks. Connected cars may be attacked by simply eavesdropping on the vehicle's network. In these attacks, the attacker is difficult to detect because the attacker does not affect the data that flows across the network despite their unauthorized access. The attacker need not be a stranger; he or she can be a legitimate user without privileges. Alternatively, an attacker may actively intervene on the vehicle's network to change data or gain a malicious advantage.

A point of attack is the bus itself and the ability to physically attach to the network at any point and begin surveillance and/or attack. This physically connected mode of attack may occur when an attacker targets a vehicle population for study and evaluation. It is from this vantage point that the attacker can plan a remote attack. The recent notoriety of a connected vehicle attack was likely possible because of the prerequisite series of physically connected attacks and resulting exploits. Subsequently, the ability to preclude or disrupt physically connected attacks and their exploits is a problem in need of a solution.

The disclosed system and process provide a secure communication protocol over an insecure infrastructure. The secure protocol allows secure communication over an unsecure in-vehicle network that may provide connectivity to networks outside of the vehicle while ensuring the integrity and provenance of the data transmitted across it. This means that in-vehicle systems can communicate with each other over an open infrastructure in a vehicle or to an arbitrary remote or local destination outside of the vehicle and be reasonably sure that its communication will be received in tact and protected in transit from an unauthorized party or destination. The secure protocol provides a series of steps that enable two or more parties to exchange information through cryptographic security. Using cryptographic parameters, the secure protocol is interoperable with independent programs and libraries (e.g., a collection of software and data files that perform different tasks). By allowing migration from one cryptographic primitive to the next, the secure protocol is extensible, efficient, and updatable allowing it to defend against new threats and keep up with improvements that come with technological efficiencies.

Figure 1:
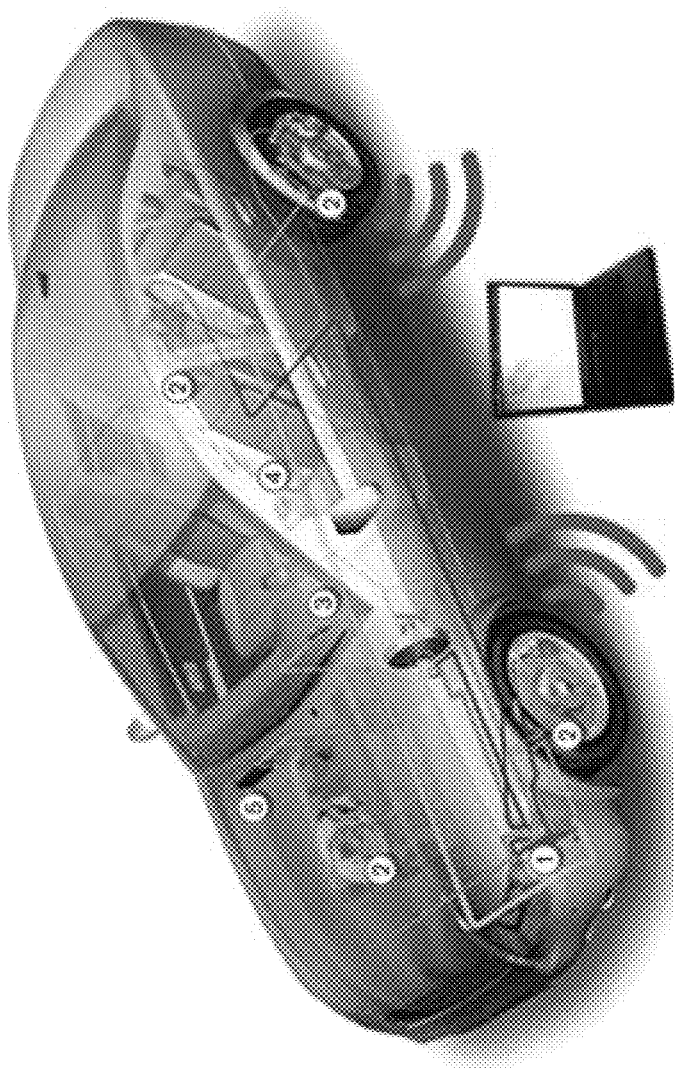
FIG. 1 illustrates electronic control units communicating across an in-vehicle bus.

FIG. 1 shows a vehicle connected to a remote node or remote destination through a wireless network. The vehicle includes multiple electronic control units (ECUs) and interfaces that are embedded in the vehicle to control one or more of the vehicle's systems or subsystems from within the vehicle. Example ECUs and interfaces include, without limitation, an electronic/engine control module (ECM), a powertrain control module (PCM), a transmission control module (TCM), a brake control module (BCM), a central control module (CCM), a central timing module (CTM), a general electronic module (GEM), a body control module (BCM), a suspension control module (SCM), an entertainment and comfort control module (ECCM), a passive keyless entry (PKE), a remote link application interface, a dedicated short range communication transceiver (DSRCT) vehicle-to-vehicle (V-2-V), V-2-I, V-2-R, and/or V-2-P, an engine and transmission unit, an airbag module, a lighting module, a vehicle access system, an on-board diagnostics interface (OBDI), a universal serial bus interface, a Bluetooth interface, a smartphone interface, etc., five of which are designated by reference numbers 1-5 in FIG. 1.

In some systems, the ECUs, such as those depicted in FIG. 1, are consolidated into one or more domain controllers which harness an advanced multiprocessor architecture. The multiprocessors execute software tailored to each electrical systems or subsystems it controls. It is capable of managing concurrent vehicle systems/subsystems that may be different from each other, execute one or more cipher suites with a gateway, and may provide access to cryptographic key storage. The use of one or more domain controllers exposes fewer nodes for attack.

Figure 2:
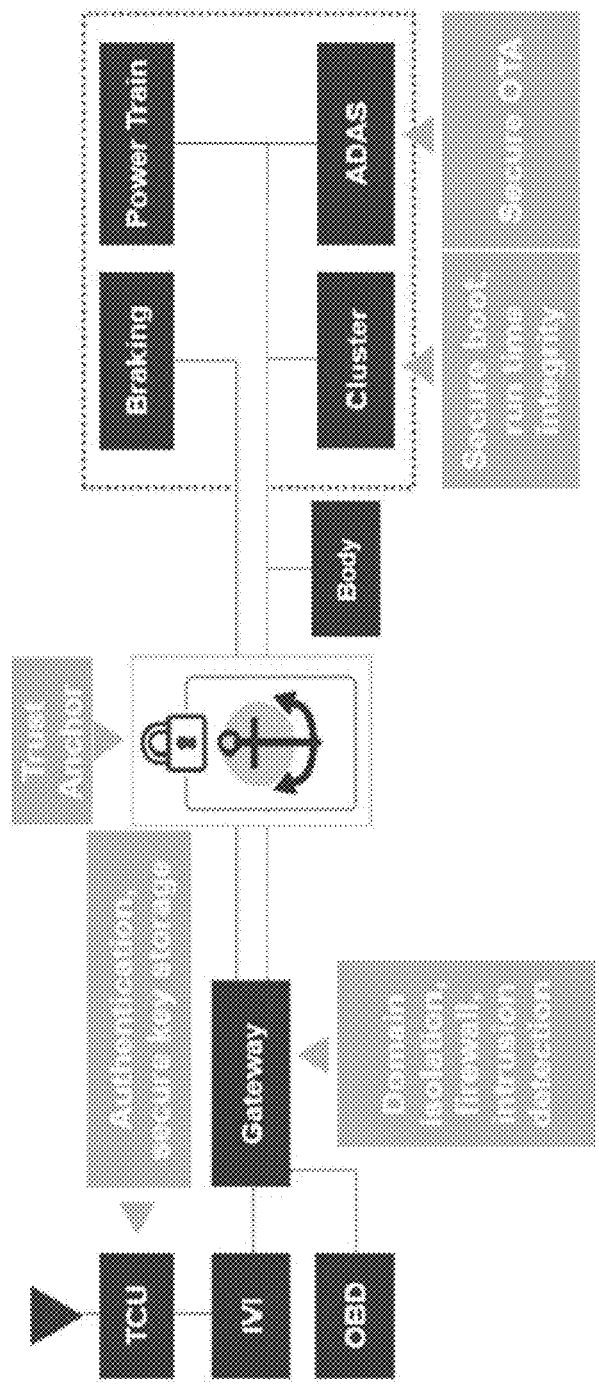
FIG. 2 illustrates a multi-level security platform.

In FIG. 1, ECUs 1-5 are connected to an in-vehicle communication link that is also called an in-vehicle network and in-vehicle bus in this disclosure. A CAN bus is an example of an in-vehicle bus. The ECUs are embedded electronic devices (e.g., specialized digital computers or signal processors) that read signals transmitted from in-vehicle sensors positioned in various parts of the vehicle to monitor vehicle conditions. The sensors detect or measure conditions by converting nonelectrical energy into discrete or analog signals. The ECUs, such as an advanced driver assistance system (ADAS) capable of communicating over the air (OTA), a powertrain controller, a braking system, and a cluster, for example, shown in FIG. 2 communicate through a root of trust (RoT) that may be remote from (as shown in the trust anchor in FIG. 2) or a unitary part of a gateway. The RoT serves as separate computing engine made up of hardware and software that are inherently trusted. The RoT controls the trusted computing platform's cryptographic processor that may be embedded in the gateway within the vehicle, may securely store the cryptographic keys, may securely store the certificate chains, may provide application and data isolation, and/or may securely sign certificates that are associated or verified by the secure protocol. As shown, all of the vehicle content (e.g., Body ECU, Braking ECU, Power Train ECU, Cluster ECU, ADAS ECU, etc.,) beyond the gateway is positioned on the trusted side of the RoT (to the right of the trust anchor), though in other configurations and implementations some controllers may not be. For example, a Body ECU that has a very low processing capabilities may be connected to the in-vehicle communication link on the untrusted side (to the left of the trust anchor) because of its limited functions or its function as an endpoint to a higher level controller. In FIG. 2, the Body ECU is shown on the trusted side because it functions may include controlling headlights, power windows and/or door locks, all of which can be integrated into an exploit (e.g., no headlights at night, open windows in a thunderstorm, etc.).

In FIG. 2, an OBD interface, telematics control unit (TCU) and an In-Vehicle infotainment (IVI) ECU communicates with the gateway across the in-vehicle communication link. The IVI manages and delivers audio content, provides navigation data, delivers rear-seat entertainment such as movies, games, social networking functions, etc., listens for incoming and sends outgoing short message service (SMS) text messages, makes/receives phone calls, and/or may access Internet-enabled or smartphone-enabled content that may include traffic reports, sports scores and weather forecasts, for example. The OBD provides access to the vehicle's self-diagnostic and reporting capability delivered through the in-vehicle communication link.

Connections with the in-vehicle communication link begins with the gateway generating a symmetric session key and an ephemeral key pair when power or ignition is cycled in the vehicle. The same key pair is used for each cryptographic shared secret exchange with each network node individually in some implementations. Once certificates and ephemeral keys are exchanged, the gateway accepts node requests for a session key. A session key is a key that is used for one communication session—such as communication that occurs during a single ignition cycle (e.g., the starting and the driving of a car and then shutting it off would be an ignition cycle) or power cycle (e.g., turning a device on and then off)—and then the session key is discarded.

The first thing each node does when it comes on online is retrieve the session key when an asymmetric handshake occurs. The session key is the same for all nodes on the in-vehicle network. However, since the secured protocol processes certificates, it establishes a shared secret, which is specific and in some instances unique for each node-gateway pair or group per power cycle/ignition cycle. The shared secret known only to the devices involved in the secure communication is used to encrypt the session key before it is transmitted across the network to a node.

Figure 3:
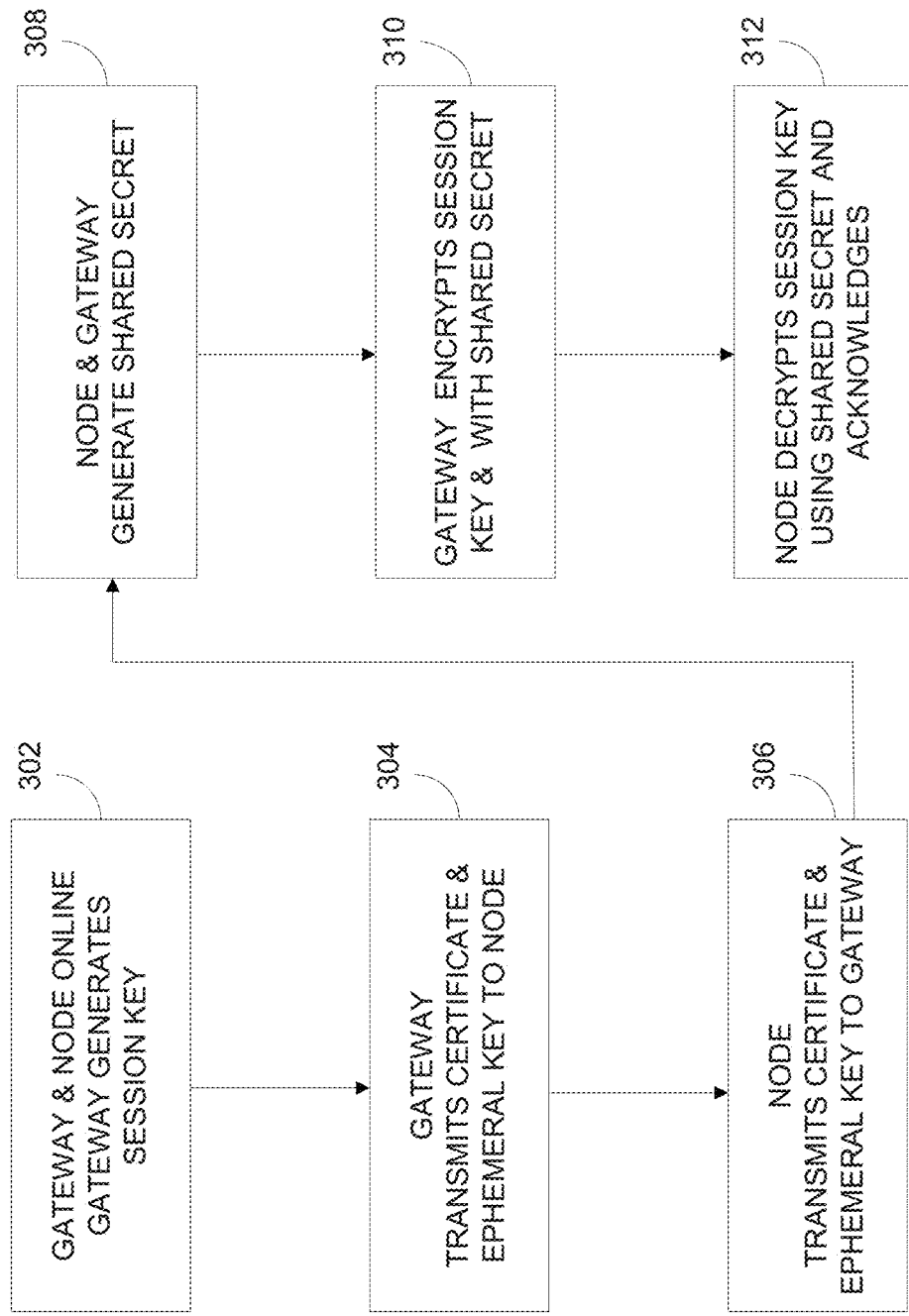
FIG. 3 is a flow chart of a key exchange.
Figure 4:
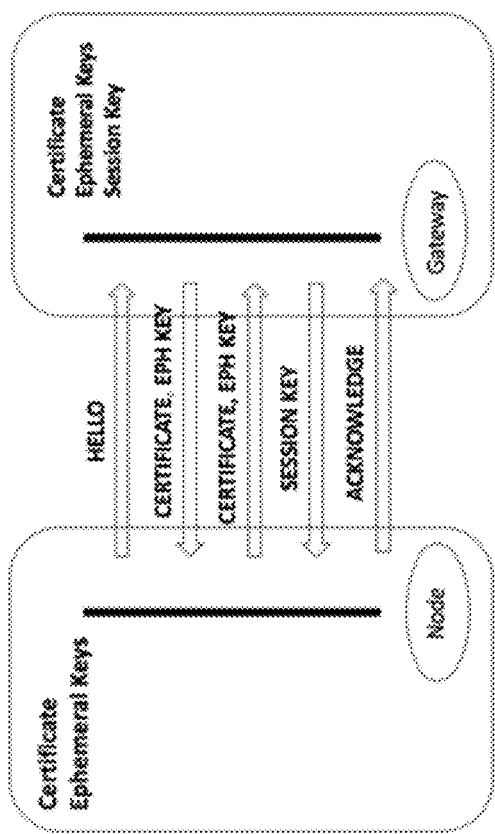
FIG. 4 shows key exchange of FIG. 3 between an electronic control unit and a gateway.

Each node on the network initiates the session key exchange as soon as it comes online. When a vehicle powers up at 302, the gateway generates the symmetric session key and a HELLO message is sent individually and separately from each node to the gateway and RoT (hereinafter considered part of the gateway) as shown in FIGS. 3 and 4. A node includes any data processing device including ECUs, domain controllers, processing devices, etc. coupled through a communication medium or link. In the secure protocol, the HELLO message comprises two bytes of data that includes information about the sending node such as its identification, for example.

| HELLO (ID: 0X011) | |
|---|---|
| Byte 1 | Byte 2 |
| Source ID | |

In response, the gateway and node provide certificates and ephemeral public keys to one another (the receiving node and gateway), respectively at 304 and 306 as shown in FIG. 3. The 304 and 306 sequence can be executed concurrently or out-of-turn. The certificates are installed when the vehicle is manufactured (e.g., prior to vehicle assembly) or during service (e.g., during component repair and/or replacement). They provide authentication for each active node and gateway communicating across the in-vehicle bus. Authentication is similar to the validation of secure sockets layer (SSL) certificates. The certificate and gateway's ephemeral key are formatted in eight byte formats in two parts (Data 1 and Data 2). The first two bytes of the gateway's certificate and ephemeral key (the first packet) are the ID fields that contain the destinations unique identifier, enabling the gateway to communicate with the proper node on the vehicle network. The third byte is the counter that tracks the number of packets transmitted, with the remaining five bytes reserved for the payload.

| GATEWAY CERTIFICATE (ID: 0X12) | | | | | | | |
|---|---|---|---|---|---|---|---|
| Byte 1 | Byte 2 | Byte 3 | Byte 4 | Byte 5 | Byte 6 | Byte 7 | Byte 8 |
| Destination ID | Counter | | Payload | | | | |

Here, a "packet" is the block of data used for transmitting information that may include payload and non-payload portions; the "payload" is the data of interest; and a "non-payload" is the packet data that is not payload data, such as routing or configuration information, for example. In some instances, the payload may include the frames transmitted on a CAN bus, such as a data frame, a remote frame, an error frame and/or an overload frame.

In the data frame (shown below), the first two bytes designate the overall length of the gateway certificate and ephemeral public key, the next two bytes designate the length of Data 1 (e.g., the gateway certificate, the wrapped session key, etc.), and the remaining four bytes are reserved for the payload. The fields that follow the second packet reserve the first two bytes of the packets for the length of D2 and the remaining bytes for the corresponding data D2. Under this format, the secure protocol transmits as many packets as needed.

| Byte 1 | Byte 2 | Byte 3 | Byte 4 | Byte 5 | — | Byte N | Byte N + 1 | Byte N + 2 | — |
|---|---|---|---|---|---|---|---|---|---|
| Overall Length | | Data 1 Length | Data 1 | . . . | | Data 2 Length | | Data 2 | . . . |

When received at a node, the gateway messages are unpacked, the gateway's certificate is reassembled and validated, and the gateway's public key is extracted from the certificate. Both the gateway's public key and ephemeral public key are then processed by the node to generate the shared secret at 308 through a cryptographic operation such as through an Elliptic Curve Menezes-Qu-Vanstone (ECMQV) cipher suite, for example.

Like the format of the gateway certificate, the node or unit certificate and its ephemeral key transmitted to the gateway at 306 have nearly the same format as the gateway's certificate messages. A substantive difference is that the destination ID field enables the gateway to distinguish node packets on the CAN bus. Conventional CAN protocol does not use addressing schemes, and thus, the destination ID serves that function. In alternative implementations the ID fields are not used, especially when locations (e.g., addresses) are identified in alternate protocols. When received at the gateway, the node messages are unpacked, the node's certificate is reassembled and validated, and the node's public key is extracted from the certificate. Both the node's public key and ephemeral public key are then processed by the gateway to generate the shared secret at 308 through the same cryptographic operation performed at the node. In this example, it is the ECMQV cipher suite.

The existing session key is then encrypted using the shared secret through a symmetric cryptographic operation at 310. The session key message transmitted to the node in FIG. 4 adheres to a similar format as the gateway certificate. The substantive difference is that instead of two pieces of data, the payload contains one—the encrypted session key.

| Byte 1 | Byte 2 | Byte 3 | Byte 4 | Byte 5 | Byte 6 | Byte 7 | Byte 8 |
|---|---|---|---|---|---|---|---|
| Destination ID | | Counter | | | Payload | | |

In this implementation, the secure protocol uses a single session key per power cycle/ignition cycle. In alternative implementations, the secure protocol can update a session key. Regardless of the version, once a successful session key extraction occurs at a node, the gateway is notified at 312. As shown in FIG. 4, the secure connection is complete when an acknowledgement is received. The acknowledgement is transported in two bytes.

| ACKNOWLEDGE (ID: 0X019) | |
|---|---|
| Byte 1 | Byte 2 |
| Source ID | |

With the secure protocol negotiated, ECUs and domain controllers may communicate using hash based message authentication codes (HMAC) that are validated at the receiving destinations. In a CAN or in-vehicle bus application, the first eight bytes of the first packet (not shown) of a secure ECU/domain controller-gateway exchange contain the data generated by the ECU/domain controller that takes the normal format that ECUs/domain controllers transmit across in-vehicle networks. HMAC code works by interleaving the first packet data, padded with zeroes to the total length of 8 bytes, with the session key and a counter value through a hash algorithm that converts the input into a small fixed length output, such as six or more bytes. In order for the reading ECU to validate the data, it needs to have the counter and the same session key. The counter is provided with the second packet.

In the second packet of the secure ECU/domain controller-gateway exchange, the schema appends three bits of zeros, as a second packet identifier, twenty-nine bits of the source ID of the node outputting data, and a counter. Under the secure protocol, each authenticator message contains a count larger than the counter that directly preceded across the in-vehicle network. In some implementations, the counter may be random or variable, may be encrypted, but it is not a time stamp. The counter effectively prevents replay and suppress-replay attacks that replay responses from a previous execution. In one implementation, the counter is programmed to fall within a range that ensures that the counter does not zero out during a session; requiring the second packet to reserve four bytes or more for the counter as shown. Here, the counter is a variable that keeps count of the messages transported across the in-vehicle network.

| AUTHENTICATOR (Second Packet) | | | | | | | |
|---|---|---|---|---|---|---|---|
| Byte 1 | Byte 2 | Byte 3 | Byte 4 | Byte 5 | Byte 6 | Byte 7 | Byte 8 |
| 3 bits of 0s 5 bits of Source ID | | Source ID | | Count | | | |

In the third packet of the secure ECU/domain controller-gateway exchange, the signature allows the gateway to match the packet to the second one, as after receiving the second packet, the reader can calculate the resulted HMAC value by using the counter, the session key and the data from the first packet. The third packet is shown below.

| SIGNATURE (ID:0X01) (Third Packet) | | | | | | | |
|---|---|---|---|---|---|---|---|
| Byte 1 | Byte 2 | Byte 3 | Byte 4 | Byte 5 | Byte 6 | Byte 7 | Byte 8 |
| 3 bits of 1s 5 bits of 0s | | | HMAC Signature | | | | |

The three packet secure ECU/domain controller-gateway exchange has many benefits including efficiently routing the packets without transporting the source ID in all three packets (e.g. see the third packet: SIGNATURE). It also streamlines the verification process at the gateway and node, so that when a byte-to-byte comparison of the received packets to previously stored trusted packets/information reveal that a packet is compromised or corrupted, the ECU waits for a second packet (having counter and CAN ID, linking it to the data packet) and a third packet, which does not have the ID, but rather HMAC hash incorporating the data, session key and the counter. The first data packet is ignored and discarded after a timeout or when another data packet having the same CAN ID is received.

Because receiving packets, such as a certificate or session key, for example, may not always reach an intended destination, the secure protocol includes messages to resend missing packets. At a node, for example, if the order of the packets is broken or the expected number is less than the expected, the node will transmit a message to the gateway through the in-vehicle bus to resend the missing packet.

| REPEAT UNIT TO GATEWAY (ID: 0x15) | | |
| --- | --- | --- |
| Byte 1 | Byte 2 | Byte 3 |
| Source ID | | Packet # |

Here, the Source ID is the reporting node ID, and the packet number is the counter value of the packet that is missing. In response to the REPEAT UNIT TO GATEWAY message, the gateway resends the packet.

Like the condition that causes a REPEAT UNIT TO GATEWAY message to issue, packets such as a certificate or ephemeral key, for example, may not always reach the gateway. At the gateway, for example, if the order of the packets is broken or the expected number is less than expected, the gateway will transmit a message to the node through the in-vehicle bus requesting that the node to resend the missing packet. Here, the Destination ID is the gateway ID, and the packet number is the counter value of the packet that is missing. In response to the REPEAT GATEWAY TO UNIT message, the node resends the packet.

| REPEAT GATEWAY TO UNIT (ID: 0x16) | | |
| --- | --- | --- |
| Byte 1 | Byte 2 | Byte 3 |
| Destination ID | | Packet # |

Figure 5:
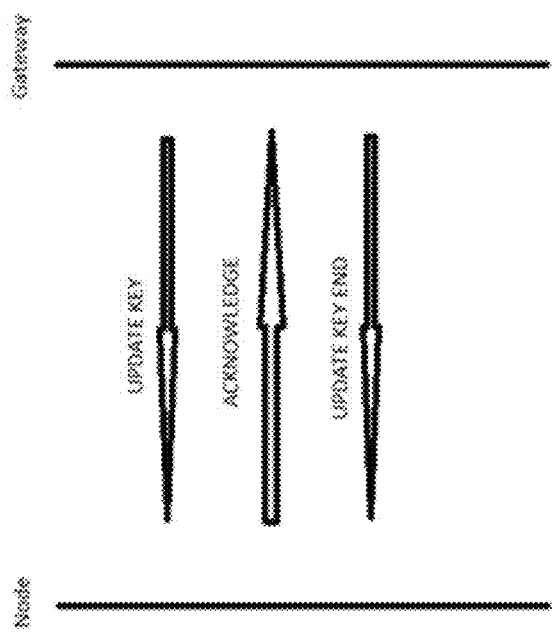
FIG. 5 is a message flow diagram for updating keys.

In some communication sessions there is sometimes a need to change session keys during a power cycle/ignition cycle. Since trusted ECU's and the gateway share the same key during a communication cycle and both operate on the same one-way function, the gateway may encrypt or wrap the new session key (generated using a random number generator or a key establishment process) with the old session key and the node decrypts the new key with the old session key by exchanging the messages shown in FIG. 5. Updates to the session key is initiated by an UPDATE KEY message from the gateway. Current implementations of the secure protocol use a key update function such as an advanced encryption standard (AES) 128-bit key algorithm. An UPDATE KEY message may comprise packets formatted as follows.

| UPDATE KEY (ID:0x17) | | | | | | | |
| --- | --- | --- | --- | --- | --- | --- | --- |
| Byte 1 | Byte 2 | Byte 3 | Byte 4 | Byte 5 | Byte 6 | Byte 7 | Byte 8 |
| Destination ID | Counter | | | | Payload | | |

The payload data may be formatted as:

| Byte 1 | Byte 2 | Byte 3 | Byte 4 | Byte 5 | — | Byte N | Byte N − 1 | Byte N |
| --- | --- | --- | --- | --- | --- | --- | --- | --- |
| Overall Length | Key Length | | Encrypted New Session Key | | | | | |

When all the packets received and all REPEAT messages are processed (if needed), the nodes inform the gateway of the successful completion of the process by sending an ACKNOWLEDGE message. When all the nodes acknowledge extracting the new session key, the gateway broadcasts a single message UPDATE KEY END.

| UPDATE KEY END (ID: 0x18) |
| --- |
| Byte 1 |
| 0xFF |

In the interim, while the nodes are updating the session key, the nodes continue signing their data with the old session key until they receive the UPDATE KEY END message. Secure message verifying is performed using both the old and new session keys in the interim in which the new session key is processed first, followed in turn by the old session key. Once the UPDATE KEY END message is broadcasted, all nodes switch to signing with the new session key.

Any node can report an error. A failed certification verification at a node, for example, may flag an error. When an error occurs, the ECU/domain controller, for example may report an error to the gateway in the following format.

| Byte 1 | Byte 2 | Byte 3 |
| --- | --- | --- |
| Destination ID | | Error # |

Each of the methods and descriptions of the protocol described herein may stand alone, and in alternative implementations, may be combined with other protocols including in-vehicle networks that employ end-to-end encryption that maintain confidentiality. In one alternative, the encryption devices (e.g., the ECUs, domain controllers, gateway, etc.) encrypt the secured non-payload data, which is recombined with the unencrypted routing information, such as for example, the source identification, destination identification, and padded source identifiers (e.g., the truncated source IDs preceded by padding). In alternative implementations, the secure protocol has a different range or more bus identifiers (IDs) and/or functional messages. In this alternative, the secure protocol also serves as a framework for the development and deployment of other IDs, messages, ciphers, and/or hashing functions allowing migration to other in-vehicle communication links/busses and/or later developed communication links/busses.

| ID | Message |
|---|---|
| 0x11 | HELLO |
| 0x12 | GATEWAY CERTIFICATE |
| 0x13 | UNIT CERTIFICATE |
| 0x14 | SESSION KEY |
| 0x15 | REPEAT UNIT TO GATEWAY |
| 0x16 | REPEAT GATEWAY TO UNIT |
| 0x17 | UPDATE KEY |
| 0x18 | UPDATE KEY END |
| 0x19 | ACKNOWLEDGE |
| 0x10 | ERROR |
| 0x01 | SIGNATURE |

In an alternative, the ECUs/domain controllers may join a secure session when ECUs/domain controllers' presence are detected on the in-vehicle bus in response to a state of health message (SOH) that is broadcasted on a CAN bus. In this alternative, the node retrieves the session key through the secure protocol described above after the node broadcasts its presence on the bus via a SOH message. When the node stops broadcasting a SOH message, the protocol executes the key updating function. Alternatively, SOH messages may supplement the secure protocol. In this implementation the SOH supplements the secure protocol by establishing that the node is operating correctly. It serves as an integrity check. In another alternative, the encryption and decryption of the secure protocol is done in hardware exclusively without appending the HMAC signature to ECU/domain controller data through an AES accelerator module that performs AES128 encryption and decryption. In this alternative, 304 and 306 of FIG. 3 are replaced by AES accelerator that perform encryption and decryption with 128-bit keys according to the AES in hardware. And, another alternate may include any combinations of structure and functions described herein (in this disclosure/application and patent) or shown in one or more or each of the figures. These systems or methods are formed from any combination of structure and function described.

This new secure protocol can be applied to existing topologies and migrate to developing topologies too. For example, while an example implementation of the secure protocol has been described with respect to the limited packet size of eight bytes that is used in classical CAN, alternative secure protocols secures flexible data-rates (FD) and packet sizes that are provisioned by the implementing network protocol of the vehicle. This means that the secure protocol protects networks that have larger or variable payload lengths (e.g., CAN 13-byte, CAN FD 64-byte, bulk download protocols, etc.), may use two or more different bit-rates, and adapt to the higher bandwidths used in developing technologies. In one example, the protocol secures a CAN frame with two different bit rates making the network backward compatible with controllers that have more limited packet lengths. One example secure protocol has larger payloads such as data frames that have up to sixty-four bits while protected by CRCs (e.g., CAN FD 64-byte).

The elements, systems, engines, methods, modules, applications and descriptions described herein may also be programmed in one or more controllers, signal processors, specialized processors and one or more processors and a coprocessor (e.g., a coprocessor is a processor distinct from a main processor, that performs additional functions to assist the main processor) through computer program code. The processors may be arranged in a parallel processing structure and/or multiprocessing structure. Parallel processing may run on a computer containing two or more processors running simultaneously. Parallel processing differs from multiprocessing in the way a task may be distributed.

The RoT, encryption, and decryption engines may comprise a processor or a portion of a program that executes or supports the described cryptographic functions. The series of steps that describe the secure protocol, involve two or more entities that is designed to accomplish the task of securing the communication of an in-vehicle bus. A "series of steps" means that the protocol has a sequence from start to finish. Unless noted, each step is completed in turn, with no step taken before the previous step is completed with some steps being optional such as the ACKNOWLEDGE message. "Involve two or more entities" means that at least two or more entities are required to establish the protocol (e.g., a node and a gateway, one or more nodes and a gateway, etc.). Finally, "designed to accomplish the task of securing the communication of an in-vehicle bus" means that the protocol must secure the communication across an in-vehicle bus. Something that looks like the protocol but does not accomplish the task of securing the communication of the in-vehicle bus is not a secure protocol.

In some systems, the elements, systems, methods, engines and descriptions described herein may be encoded in a non-transitory signal bearing storage medium, a computer-readable medium, or may comprise logic stored in a memory that may be accessible through an interface. Some signal-bearing storage medium or computer-readable medium comprise a memory that is unitary or separate (e.g., local or remote) from the vehicle. If the descriptions are performed by software, the software may reside in a memory resident to or interfaced to the one or more processors, ECUs, domain controllers, and/or gateways.

The memory or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. When messages, ECUs, domain controllers, gateway, and/or other device functions or steps are said to be "responsive to" or occur "in response to" a function or message, the messages, ECUs, domain controllers, gateway, and/or other device functions or steps necessarily occur as a result of the message or function. It is not sufficient that a function or act merely follow or occur subsequent to another.

The disclosed system and process provide a secure communication protocol that secures communication over an insecure infrastructure such as for a vehicle through a vehicle bus. A vehicle may comprise, without limitation, a car, bus, truck, tractor, motorcycle, bicycle, tricycle, quad-ricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things. The secure protocol creates secure communication over an unsecure vehicle bus, such as a CAN bus, that may communicate across remote wireless and/or landline channels while ensuring the integrity and provenance of the data transmitted across it. This means that in-vehicle systems can communicate with each other over an open infrastructure to an arbitrary remote or local destination and be reasonably sure that it will be received in tact and protected. The secure protocol provides a series of steps that enable two or more parties to exchange information through cryptographic operations that effectively preclude or disrupt physically connected attacks and their exploits among others because they are not privy to the cryptographic operations. Using cryptographic parameters, the secure protocol is interoperable with independent programs and libraries. By allowing migration from one cryptographic primitive to the next, the secure protocol is extensible, efficient, and updatable allowing it to defend against new threats and keep up with improvements that come with changes in technology.

Other systems, methods, features and advantages will be, or will become, apparent to one with skill in the art upon examination of the figures and detailed description. It is intended that all such additional systems, methods, features and advantages be included within this description, be within the scope of the invention, and be protected by the following claims.

What is claimed is:

1. A system to secure a communication across an in-vehicle network, comprising:
   a gateway within a vehicle, the gateway to generate a session key and send a cryptographic certificate and an ephemeral key to the in-vehicle network; and
   an electronic control unit within the vehicle, the electronic control unit to send a cryptographic certificate and an ephemeral key to the in-vehicle network,
   wherein the gateway generates a shared secret in response to the cryptographic certificate and the ephemeral key sent by the electronic control unit,
   wherein the electronic control unit generates the shared secret in response to the cryptographic certificate and the ephemeral key sent by the gateway, and
   wherein the gateway, in response to validation of the cryptographic certificate sent by the electronic control unit, encrypts the session key with the shared secret, and sends the encrypted session key to the electronic control unit.

2. The system of claim 1, wherein the gateway includes a cryptographic processor.

3. The system of claim 1, wherein the in-vehicle network comprises a Controller Area Network bus utilizing more than one bit-rate and packet size provisioned by an in-vehicle bus protocol.

4. The system of claim 1, wherein the shared secret is generated in response to a hash based method authentication code.

5. The system of claim 1, wherein different cryptographic certificates are provided to the gateway and the electronic control unit, respectively.

6. The system of claim 1, wherein the gateway establishes a connection with the in-vehicle network.

7. The system of claim 1, wherein the electronic control unit:
   receives the encrypted session key over the in-vehicle network, and
   decrypts the encrypted session key based on the shared secret generated at the electronic control unit.

8. The system of claim 1, wherein the session key is valid during only one communication session that occurs during an ignition cycle of the vehicle.

9. The system of claim 1, wherein the session key is valid during only one communication session that occurs during a power cycle.

10. The system of claim 1, wherein the in-vehicle network is encrypted end-to-end.

11. The system of claim 1, wherein the electronic control unit transmits data encrypted by the session key over the in-vehicle network.

12. The system of claim 1, wherein the electronic control unit communicates with a second vehicle using the session key.

13. The system of claim 1, wherein the gateway comprises a Root of Trust to securely store the cryptographic certificate and the ephemeral key of the gateway.

14. A vehicle, comprising:
   an in-vehicle network;
   a gateway within the vehicle, the gateway to generate a session key and send a cryptographic certificate and an ephemeral key across the in-vehicle network;
   an electronic control unit within the vehicle, the electronic control unit to send a cryptographic certificate and an ephemeral key across the in-vehicle network,
   wherein the gateway generates a shared secret in response to the cryptographic certificate and the ephemeral key sent by the electronic control unit,
   wherein the electronic control unit generates the shared secret in response to the cryptographic certificate and the ephemeral key sent by the electronic control unit, and
   wherein the gateway, in response to validation of the cryptographic certificate sent by the electronic control unit, encrypts the session key with the shared secret, and sends the encrypted session key across the in-vehicle network to the electronic control unit.

15. The vehicle of claim 14, wherein the electronic control unit:
   receives the encrypted session key over the in-vehicle network from the gateway, and
   decrypts the encrypted session key based on the shared secret generated at the electronic control unit.

16. The vehicle of claim 14, wherein the session key is valid during only one communication session that occurs during an ignition cycle of the vehicle.

17. The vehicle of claim 14, wherein the session key is valid during only one communication session that occurs during a power cycle.

18. The vehicle of claim 14, wherein the electronic control unit transmits data encrypted by the session key across the in-vehicle network.

19. The vehicle of claim 14, wherein the electronic control unit communicates with a second vehicle using the session key.

20. The vehicle of claim 14, wherein the gateway comprises a Root of Trust to securely store the cryptographic certificate and the ephemeral key of the gateway.

* * * * *